United States Patent
Tanaka

[19]

[11] Patent Number: 5,953,734
[45] Date of Patent: Sep. 14, 1999

[54] ELECTRONIC APPARATUS

[75] Inventor: Kiyoko Tanaka, Yamatokoriyama, Japan

[73] Assignee: Sharp Kabushiki Kaisha, Osaka, Japan

[21] Appl. No.: 08/935,032

[22] Filed: Sep. 22, 1997

[30] Foreign Application Priority Data

Sep. 27, 1996 [JP] Japan ................................. 8-255636

[51] Int. Cl.⁶ ................................................. G06T 1/00
[52] U.S. Cl. ........................................... 707/541; 708/112
[58] Field of Search ........................... 707/541; 345/350, 345/358, 326; 708/141, 112, 160

[56] References Cited

U.S. PATENT DOCUMENTS

| | | | |
|---|---|---|---|
| 4,780,839 | 10/1988 | Hirayama | 708/160 |
| 5,199,104 | 3/1993 | Hirayama | 345/350 |
| 5,347,579 | 9/1994 | Blandford | 380/25 |
| 5,664,175 | 9/1997 | Jackson et al. | 707/7 |

FOREIGN PATENT DOCUMENTS 4-015864  1/1992  Japan .

*Primary Examiner*—Joseph H. Feild
*Attorney, Agent, or Firm*—Nixon & Vanderhye, P.C.

[57] ABSTRACT

To provide an electronic apparatus capable of corresponding both to an application such as a schedule function having a date input item and an application having no date input item where a schedule can be controlled, when a power source of a main body is turned on, current date/time data is read from a clock portion, the date/time data read from the clock portion and stored in a date/time data portion, is compared with date/time data of a title stored in a handwritten memo title portion by a data comparing portion and when the both data coincide with each other, handwritten memo data stored in a handwritten memo data portion is displayed with the coincided date/time data as the title.

5 Claims, 16 Drawing Sheets

ELECTRONIC APPARATUS

BACKGROUND OF THE INVENTION

1. Field of the Invention

The present invention relates to an electronic apparatus such as an electronic notebook, a portable information terminal or the like.

2. Description of the Related Art

As a prior art, for example, Japanese Unexamined Patent Publication JP-A 4-15864 (1992) discloses that a schedule of which contents are prestored in an electronic apparatus incorporating a clock, along with a date, is displayed when power source is turned on.

Such prior art can deal with an application such as a schedule function having a date input item, however it cannot deal with an application inherently having no date input item.

SUMMARY OF THE INVENTION

The invention has been carried out with an object of resolving the above-mentioned problems, and in a first aspect of the invention, an electronic apparatus comprises handwritten information inputting means for inputting handwritten information, title inputting means for inputting a title of the handwritten information inputted by the handwritten information inputting means, memory means for correspondingly storing the handwritten information inputted by the handwritten information inputting means and the title inputted by the title inputting means, time measuring means for measuring a current date, determining means for determining whether the title stored in the memory means includes date information, comparing means for comparing the date information of the title with the current date when the title is judged from a result of determination by the determining means as including the date information, and displaying means for displaying the handwritten in formation stored in correspondence with the title when the date information in the title is judged from a result of comparison by the comparing means as being coincident with the current date.

In this way, even with a function having no date input item other than a schedule function, easiness of use can be provided similar to that in the case where the date input item is not provided without especially providing an exclusively used item for inputting date.

In a second aspect of the invention, an electronic apparatus comprises handwritten information inputting means for inputting handwritten information, title inputting means for inputting a title of the handwritten information inputted by the handwritten information inputting means, memory means for correspondingly storing the handwritten information inputted by the handwritten information inputting means and the title inputted by the title inputting means, time measuring means for measuring a current date, determining means for determining whether the title stored in the memory means includes date information, comparing means for comparing the date information of the title with the current date when the title is judged from a result of determination by the determining means as including the date information, storage means for, when the date information in the title is judged from a result of comparison by the comparing means as being coincident with the current date, storing information of the coincidence in the memory means in correspondence of the information to the title and the handwritten information, and displaying means for displaying the stored handwritten information, in correspondence of the information where the date information coincides with the current date by the storage means in response to turning on a power source.

In this way, even with a function having no date input item other than a schedule function, easiness of use can be provided similar to that in the case where the date input item is not provided without especially providing an exclusively used item for inputting date.

In a third aspect of the invention, the electronic apparatus according to the second aspect, further comprises erasing means for erasing from the storage means the information of the coincidence, stored in correspondence with the handwritten information displayed by the displaying means in response to turning on the power source.

Accordingly, unnecessary display can be prevented.

In a fourth aspect of the invention, the electronic apparatus according to the second aspect further comprises setting means for setting whether the displaying means displays the handwritten information stored in correspondence with the information of the coincidence at every time of turning on the power source or displays only once in response to turning on the power source.

Thereby, a display in compliance with an object of a user is made possible.

In a fifth aspect of the invention, the displaying means displays the current date along with the handwritten information.

Thereby, not only information necessary for the day but a current date is known whereby easiness of use is improved.

BRIEF DESCRIPTION OF THE DRAWINGS

Other and further objects, features, and advantages of the invention will be more explicit from the following detailed description taken with reference to the drawings wherein:

FIGS. 24A and 24B are views showing display examples of a screen when a power source is turned on.

DETAILED DESCRIPTION OF THE PREFERRED EMBODIMENTS

Figure 1:
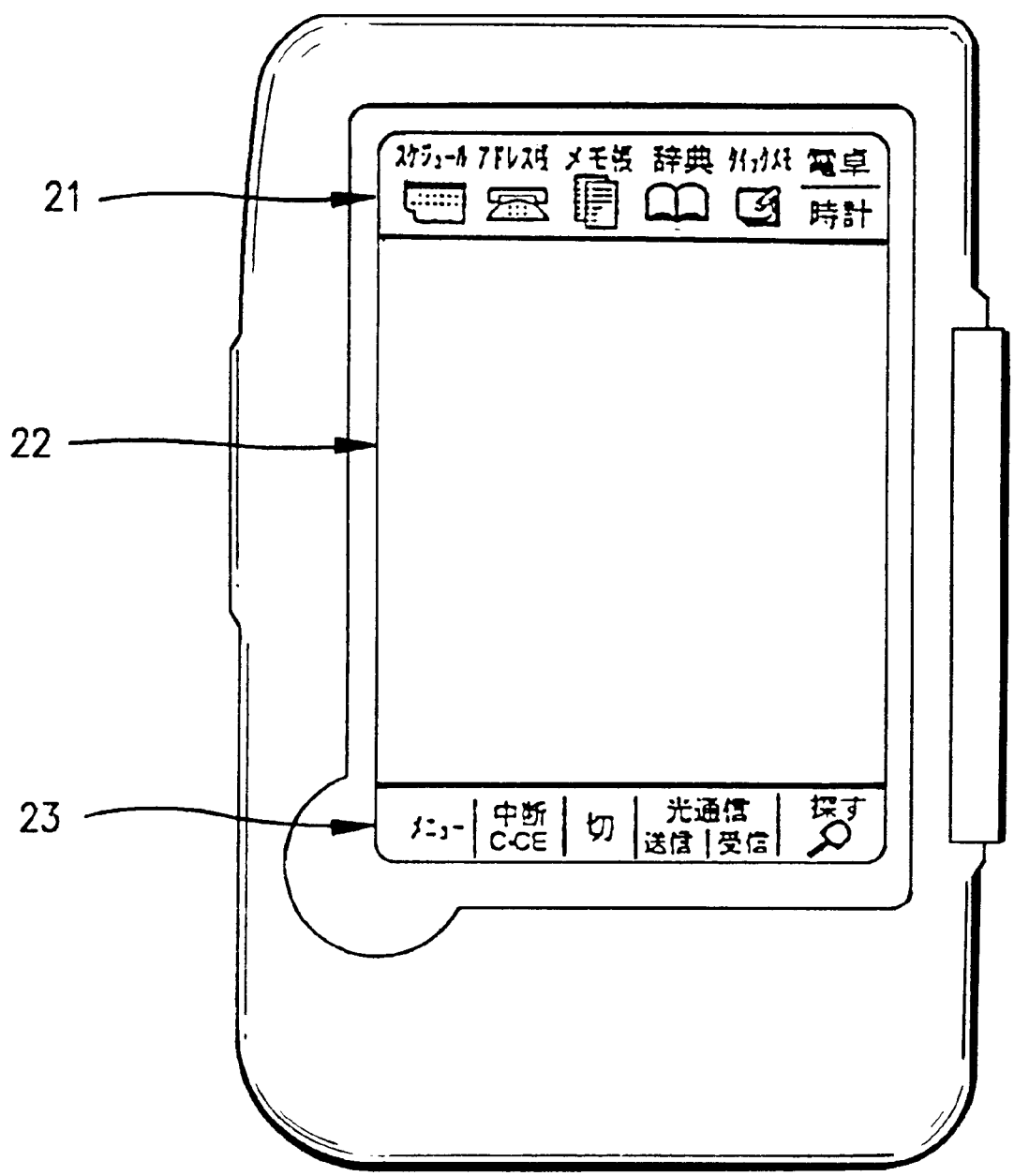
FIG. 1 is an outside view of an electronic apparatus according to the invention.

Now referring to the drawings, preferred embodiments of the invention are described below.

FIG. 1 is an outside view of an electronic apparatus according to the present invention.

The electronic apparatus according to the invention can be used in calendar, schedule, memo note and quick memo applications and comprises a group of application switch keys 21 for selecting the applications, a liquid crystal touch panel portion 22 where a liquid crystal display unit for displaying letters/figures and a transparent tablet of an analog type are integrally formed, and a group of keys 23 including a key for turning off a power source.

Further, the power source of the electronic apparatus of the invention is put into ON state by touching the liquid crystal touch panel portion 22 in OFF state by a pen or the like.

Figure 2:
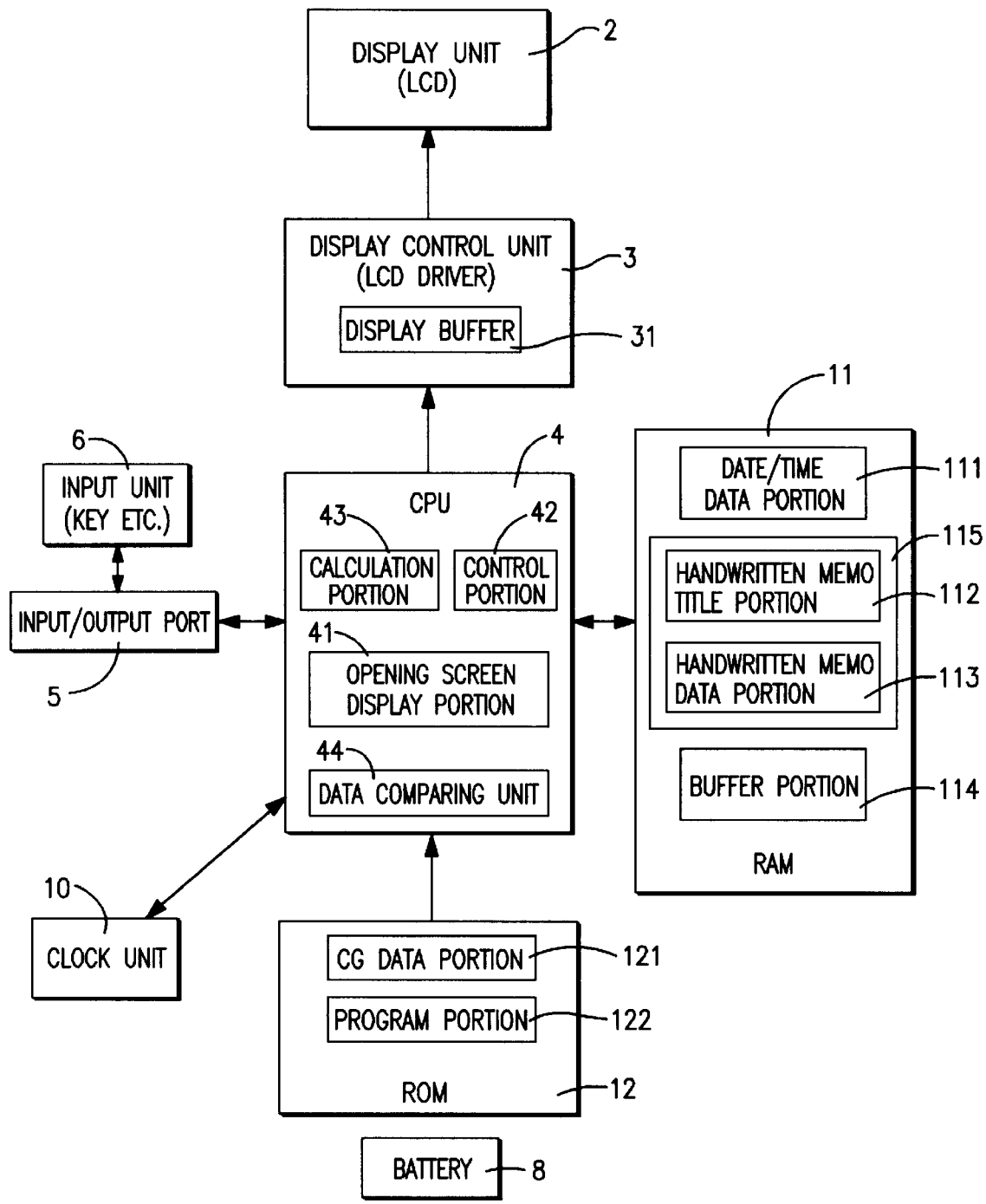
FIG. 2 is a system block diagram of an electronic apparatus according to the invention.

FIG. 2 is a system block diagram of an electronic apparatus according to the invention.

The electronic apparatus of the invention comprises a display unit 2, a display control unit 3, a CPU (Central Processing Unit) 4, an input/output port 5, an input unit 6, a battery 8, a clock unit 10, a RAM (Random Access Memory) 11 and a ROM (Read Only Memory) 12.

The display unit 2 is, for example, a liquid crystal display apparatus (hereinafter, referred to as LCD) of a dot matrix structure which displays a result of calculation , a message or the like by writing display data into a display buffer 31 of the display control unit (hereinafter, referred to as LCD driver) 3 on a basis of a control signal from the CPU 4.

The CPU 4 executes operational calculation processing such as input/output in total and a data comparing unit 44 compares data in the RAM 11. Further, key input from the input unit 6 is processed by the CPU 4 via the input/output port 5 whereby which key was inputted is determined.

The RAM 11 is a memory area for storing data inputted in the main body of the electronic apparatus including a date/time data portion 111 for reading and storing date/time (year, month, day, day of week, hour, minute, second) set to the clock unit 10, a handwritten data portion 115 including a hand written title data portion 112 storing a title portion of handwritten memo data and a handwritten memo data portion 113 storing handwritten data, and a buffer portion 114 used for displaying by reading a series of data from the handwritten data portion 115 or correcting it, and the RAM 11 is backed up by the battery 8 whereby the content is not erased even when power source is put into OFF state.

ROM 12 is composed of a CG (Computer Graphic) data portion 121 storing fonts used in displaying letters and a program portion 122 storing programs for realizing various functions of the main body of the electronic apparatus and the invention.

Figure 3:
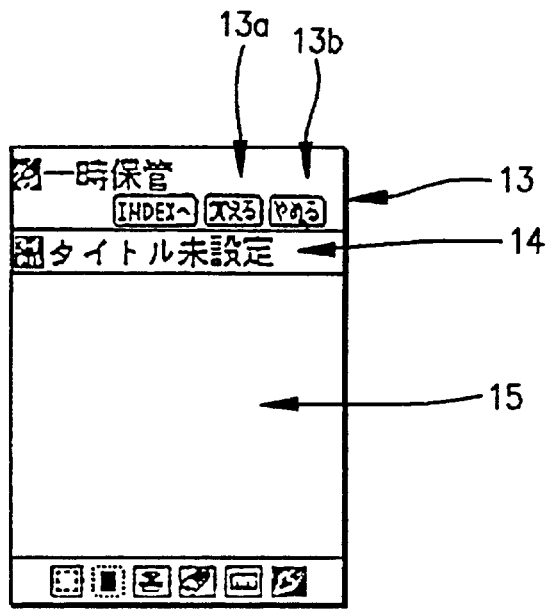
FIG. 3 is a view showing a display example of a quick memo screen.

FIG. 3 is a display example of a quick memo screen which is an input screen of a handwritten memo of an application displayed in LCD 2 when "quick memo" is selected from the group of application switch keys 21 illustrated in FIG. 1, which is composed of a group of input keys 13, a title display portion 14 and a handwritten input frame 15.

The group of input keys 13 includes a "memorize" key 13a for storing data, a "stop" key 13b for stopping operation etc. and when positions displaying the keys are instructed by an input pen or the like, the positions are read by a transparent tablet provided above LCD 2 and operation corresponding to display content in corresponding with coordinates thereof is executed.

Figure 4:
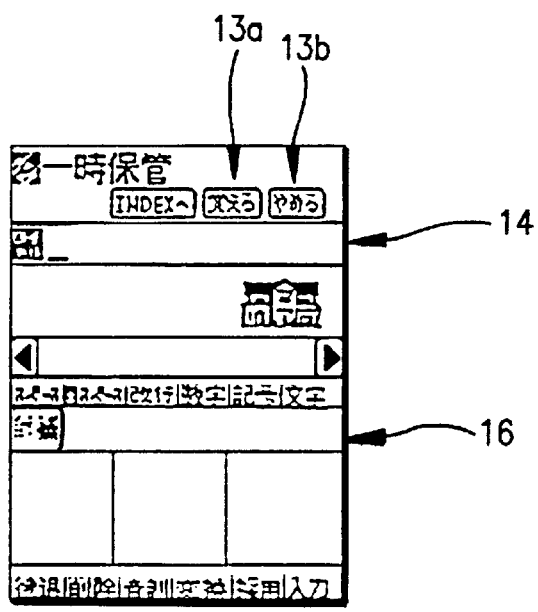
FIG. 4 is a view showing a display example of a title input screen.

FIG. 4 illustrates a display example of a title input screen where the operation is shifted from the quick memo screen of FIG. 3 to the screen by touching the title display portion 14 by a pen whereby an input key board 16 is displayed in the handwriting input frame 15.

The input key board 16 is composed of a group of data input keys for inputting letter information, numerical value information and sign information used in respective applications. Inputted handwritten letters are displayed as a title in the title display portion 14 by using the input key board 16. Further, handwritten information can be inputted.

Figure 5:
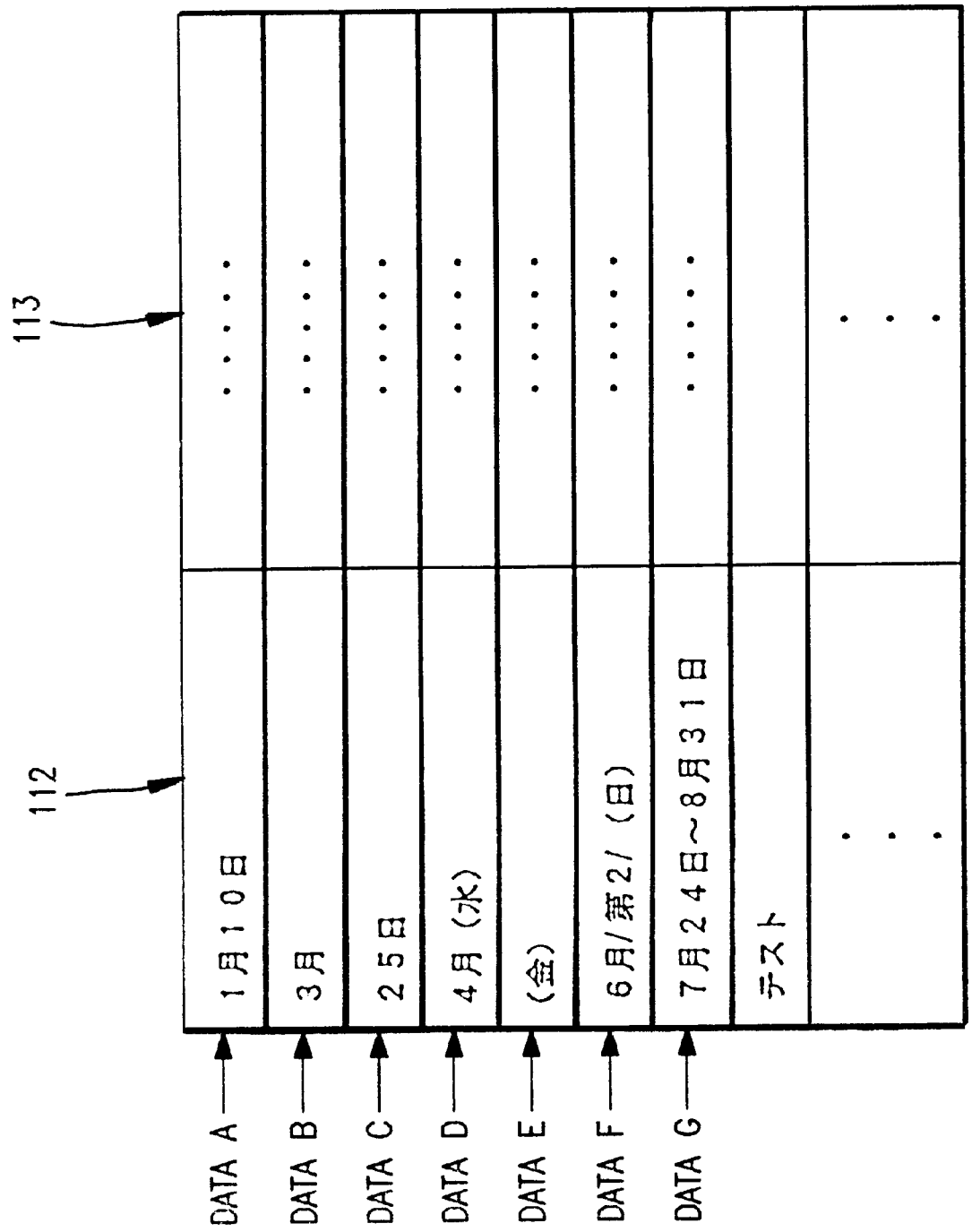
FIG. 5 is a view showing a memory example of a handwritten memo title portion and a handwritten memo data portion of a RAM.

FIG. 5 is a diagram showing how the data is stored in the handwritten memo title portion 112 and the handwritten memo data portion 113 in the handwritten data portion 115 of the RAM 11 in FIG. 2 where one series of handwritten memo data is composed of the handwritten memo title portion 112 and the handwritten memo data portion 113 which corresponding to each other. Title letters inputted by using the input key board 16 are stored in the handwritten memo title portion 112. Also, the handwritten information is stored in the handwritten memo data portion 113.

Explaining by using specific examples, data A shows an example where "1月 10日" (1st month 10th day) is inputted in the handwritten memo title portion 112 when an opening screen of January 10 is intended to designate. Data B shows an example where "3月" (3rd month) is inputted in the handwritten memo title portion 112 when an opening screen of March is intended to designate. Data C shows an example where "25日" (25th day) is inputted in the handwritten memo title portion 112 when an opening screen of 25th day is intended to designate. Data D shows an example where "4月 (水)" (4th month (Wednesday)) is inputted in the handwritten memo title portion 112 when an opening screen of Wednesday of April is intended to designate. Data E shows an example where " 金" ((Friday)) is inputted in the handwritten memo title portion 112 when an opening screen of Friday is intended to designate. Data F shows an example where "6月/第2/(日)" (6th month/2nd/(Sunday)) is inputted in the handwritten memo title portion 112 when an opening screen of the second Sunday of June is intended to designate. Data G shows an example where "7月 24日~8 月 31日" (7th month 24th day—8th month 31st day) is inputted in the handwritten memo title portion 112 when an opening screen of from July 24 to August 31 is intended to designate. The other portions signify normal handwritten memo titles. Here, "/" signifies AND of a date condition.

Figure 6:
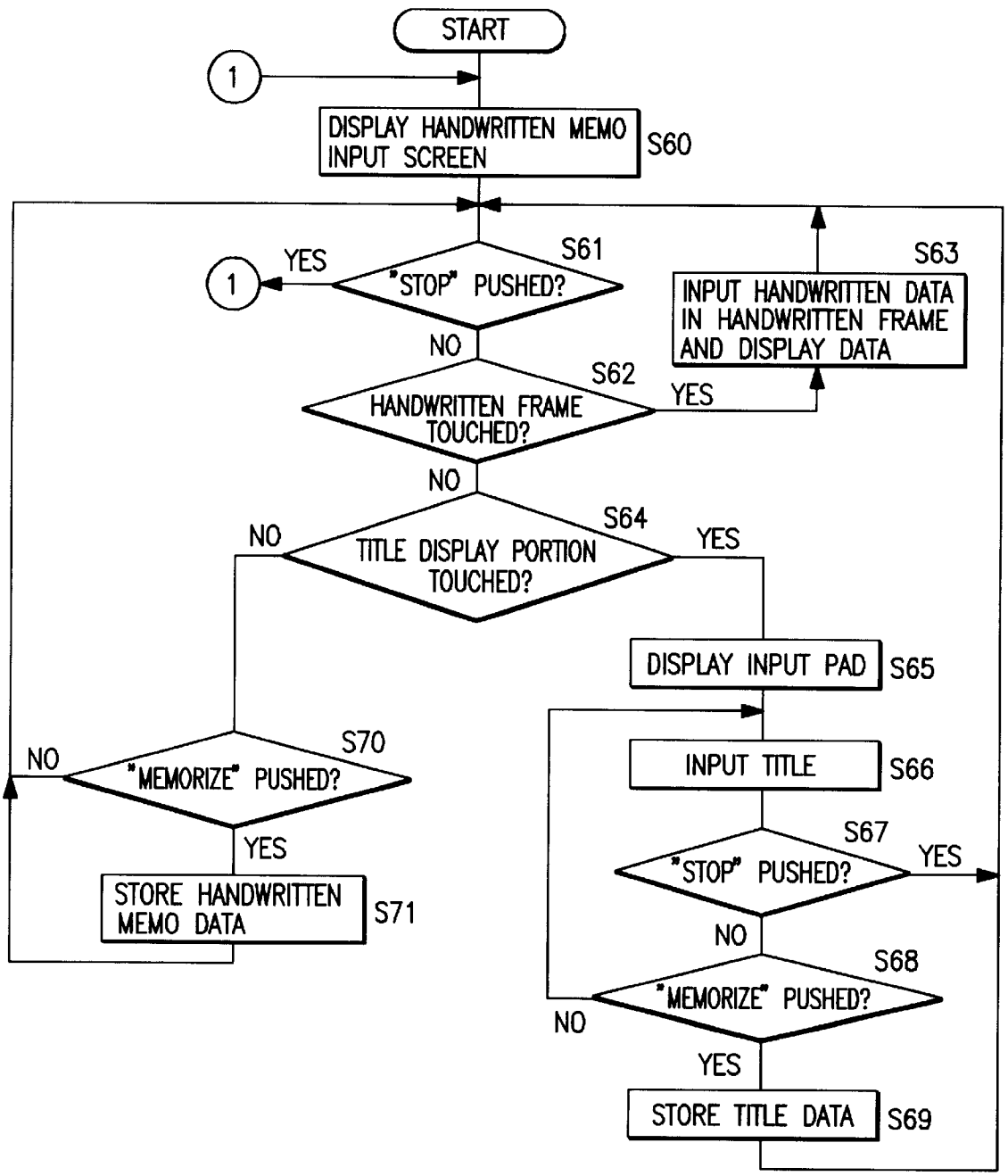
FIG. 6 is a flowchart concerning input processing of a handwritten memo data and a hand written memo title.

FIG. 6 is a flowchart showing the operation of the CPU 4 concerning input processing of handwritten data and handwritten memo title.

Figure 7:
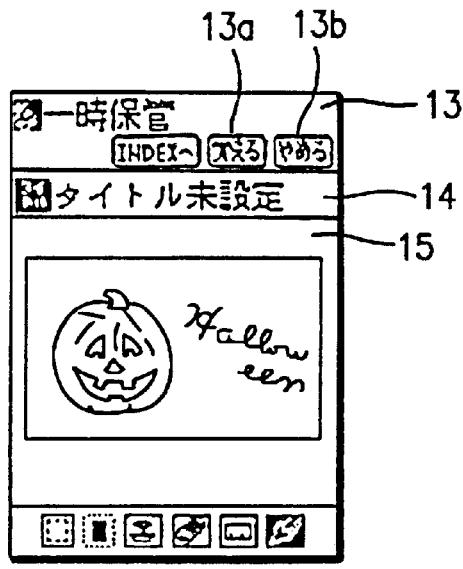
FIG. 7 is a view showing a display example of a quick memo screen.

First, at step S60, the quick memo screen as shown in FIG. 3 is displayed when "quick memo" is selected from a group of application switch keys 21. At step S61, when the "stop" key 13b of FIG. 3 is pushed, the operation returns to a screen before selecting the "quick memo" and awaits until the handwritten input frame 15 is touched by a pen at step S62 when the "stop" key 13b is not pushed. When the handwritten input frame 15 is touched by a pen at step S62, the operation proceeds to step S63, handwritten data is inputted in the handwritten input frame 15 and inputted data is displayed. For example, FIG. 7 shows an input display example where handwritten data of "Halloween" is inputted.

The handwritten input is continued until the title display portion 14 of FIG. 3 is touched by a pen at step S64 or "memorize" key 13a is pushed at step S70. When "memorize" key 13a is pushed at step S70, the handwritten memo data "Halloween" is stored in the handwritten memo data portion 113 of FIG. 2 at step S71. When "memorize" key 13a is not pushed at step S70 and when the processing at step S71 is finished the operation returns to step S61.

When the title display portion 14 of FIG. 3 is touched by a pen at step S64, the operation proceeds to step S65 where the title input screen of FIG. 4 appears. Then, a title is inputted by using the input key board 16 of FIG. 4 at step S66. In respect of the inputting operation at step S66, the inputted data is replaced by data codes by using, for example, letter recognition. Further, at step S67, whether "stop" key 13b of FIG. 4 is pushed is determined and when "stop" key 13b is pushed, inputting of title is stopped, the screen is changed to the quick memo screen of FIG. 3, the operation returns to step S61 where handwritten input can be executed successively.

Figure 8:
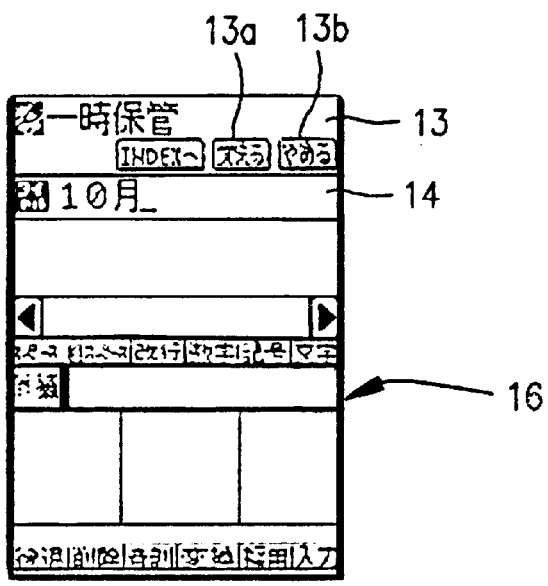
FIG. 8 is a view showing a display example of a title input screen.

When the "stop" key 13b is not pushed at step S67, successively, whether "memorize" key 13a of FIG. 4 is pushed is determined at step S68 and the input ting of a title is continued until "memorize" key 13a is pushed. For example, FIG. 8 shows an input display example where "10th mo. " is inputted to the title of the handwritten data "Halloween". When "memorize" key 13a of FIG. 4 is pushed, handwritten title data of "10月" (10th month) inputted at step S69 is stored in the handwritten memo title portion 112 of FIG. 2 in correspondence to the handwritten memo data portion 113 of FIG. 2 storing the handwritten data of "Halloween" which has been handwritten in the handwritten frame.

When the title data is stored at step S69, the screen is again changed into the quick memo screen of FIG. 3, the operation returns to step S61 and successive handwritten memo data is inputted. When "memorize" key 13a is not pushed at step S68, the operation returns to step S66.

By the above-described processing, the handwritten memo title and the handwritten memo data can be stored respectively in the handwritten memo title portion 112 and the handwritten memo data portion 113 of the RAM 11. Although the title is stored by ASCII code in this case, it may be stored by other system (shift JIS code, JIS code or the like).

Figure 9:
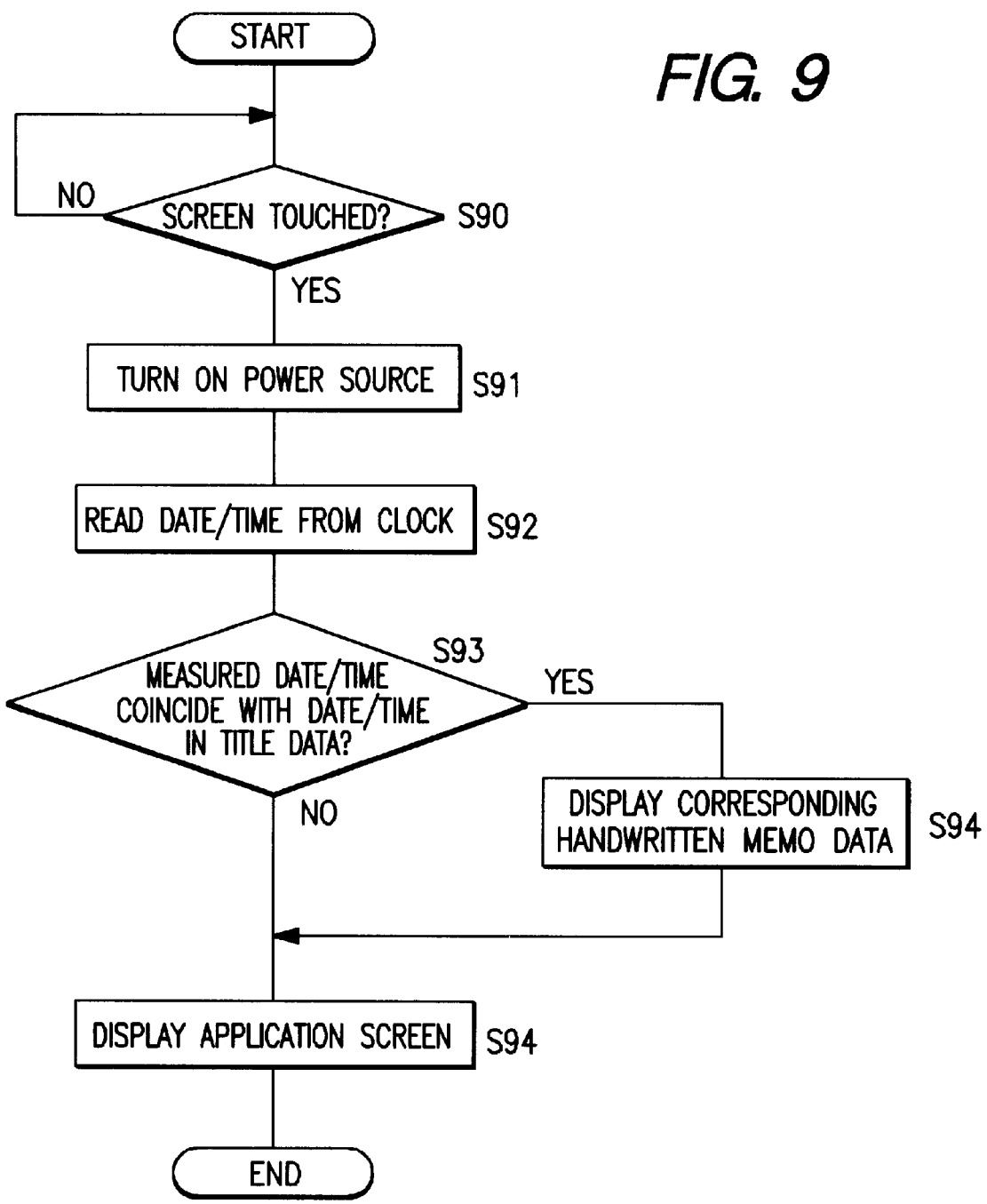
FIG. 9 is a flowchart concerning processing of a basic operation accompanied by power switch ON operation.

FIG. 9 is a flow chart concerning processing of a basic operation of the CPU 4 accompanied by power source ON operation. An explanation will be given of opening display processing of handwritten memo data stored in the RAM 11 in reference to FIG. 9.

Whether the liquid crystal touch panel portion 22 provided to the main body of the electronic apparatus is touched by a pen is determined at step S90 and the operation proceeds to step S91 when touching of the liquid crystal touch panel portion 22 is detected.

Figure 10:
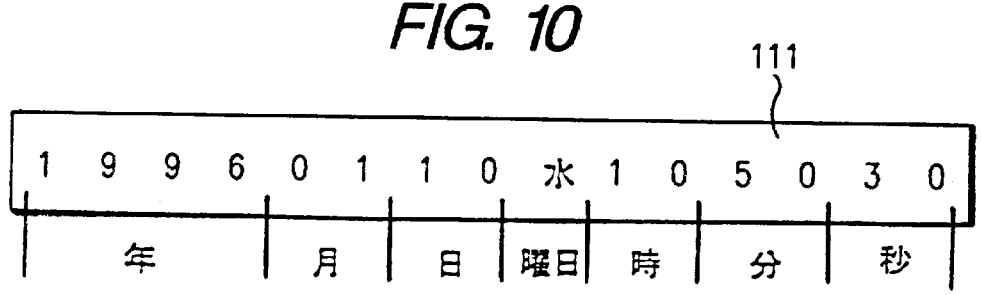
FIG. 10 is a view showing a memory example of date/time data portion.

At step S91, initial settings and the like for turning on the power source of the main body are carried out whereby the power source is turned on. At step S92, the date/time data (year, month, day, day of week, hour, minute, second) supplied from the clock unit 10 via the CPU 4 in FIG. 2 is stored in the date/time data portion 111 of the RAM 11 in FIG. 2 as illustrated in FIG. 10. FIG. 10 shows an example where "the year 1996, 1st mo. 10th d., Wed. 10 hr. 50 min. 30 sec." is read out from the clock unit 10.

Figure 11:
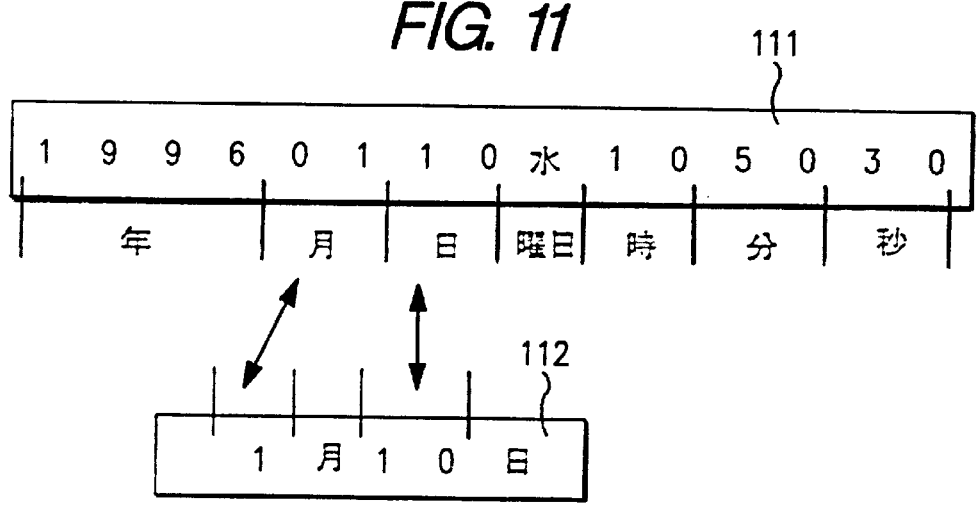
FIG. 11 is a view for explaining comparative positions of a date/time data portion and a handwritten memo title portion.

At step S93, in the data comparing portion 44 of the CPU 4 in FIG. 2, as shown in FIG. 11, date/time data which has been previously read out from the clock unit 10 and stored in the date/time data portion 111 is compared with a title stored in the handwritten memo title portion 112. At step S93, by detecting the units of date/time (year, month, day, hour, minute, second) included in the data of the handwritten memo title portion 112 and specific signs, whether the data of the handwritten memo title portion 112 signifies the date/time or letter title, is determined. Further, when it signifies the date/time, the data is compared with the date/time of the date/time data portion 111.

When the date/time measured by the clock unit 10 coincides with the date/time in the handwritten memo title at step S93, the opening screen display portion 41 of the CPU 4 in FIG. 2 transmits the handwritten memo data where the coincided date/time is stored as a title from the handwritten memo data portion 113 to the display buffer 31 of FIG. 2, at step S94. The transmitted data is displayed on the screen of the display unit 2. Meanwhile, when it is determined that the both data do not coincide with each other at step S93, the operation proceeds to step S95 and displays an application screen without displaying an opening screen. In comparing the date/time's at step S93, as shown in FIG. 11, the units of "year, month, day, hour, minute, second" and specific signs of the handwritten title portion 112 are removed from objects of comparison.

An explanation will be given of a method of comparing data stored in the date/time data portion 111 of FIG. 2, which is read out from the clock unit 10 performed at step S93 of FIG. 9 with data of the handwritten memo title portion 112 in reference to FIG. 11 through FIG. 17.

Figure 12:
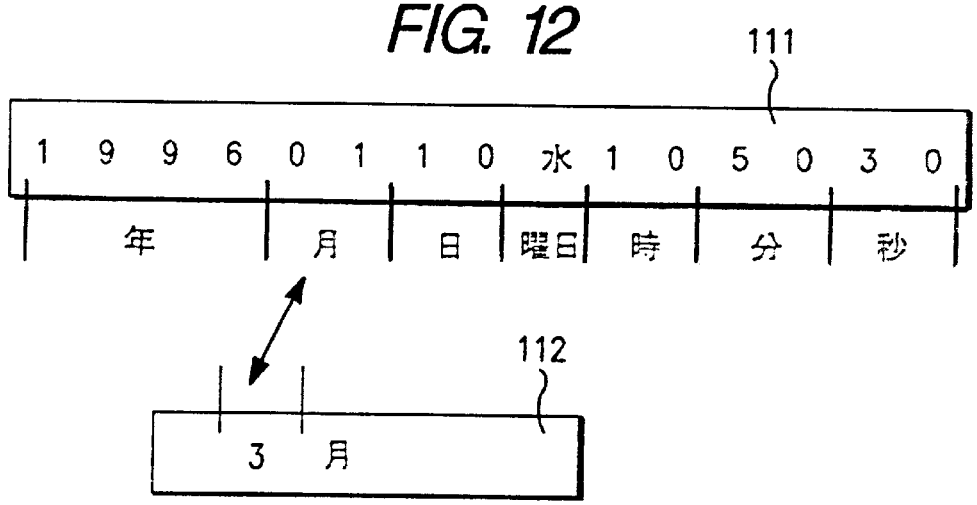
FIG. 12 is a view for explaining comparative positions of a date/time data portion and a handwritten memo title portion.
Figure 13:
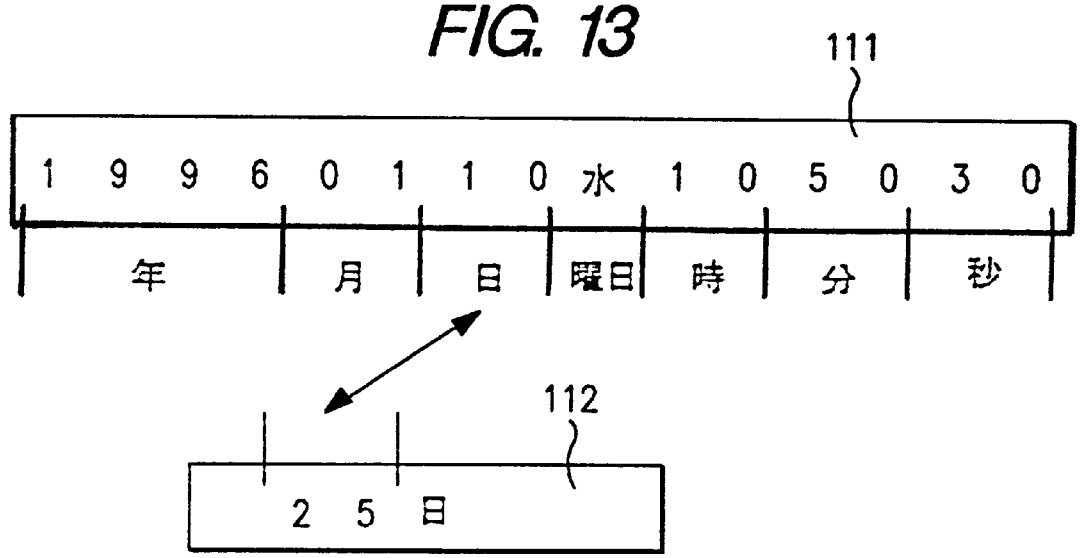
FIG. 13 is a view for explaining comparative positions of a date/time data portion and a handwritten memo title portion.
Figure 14:
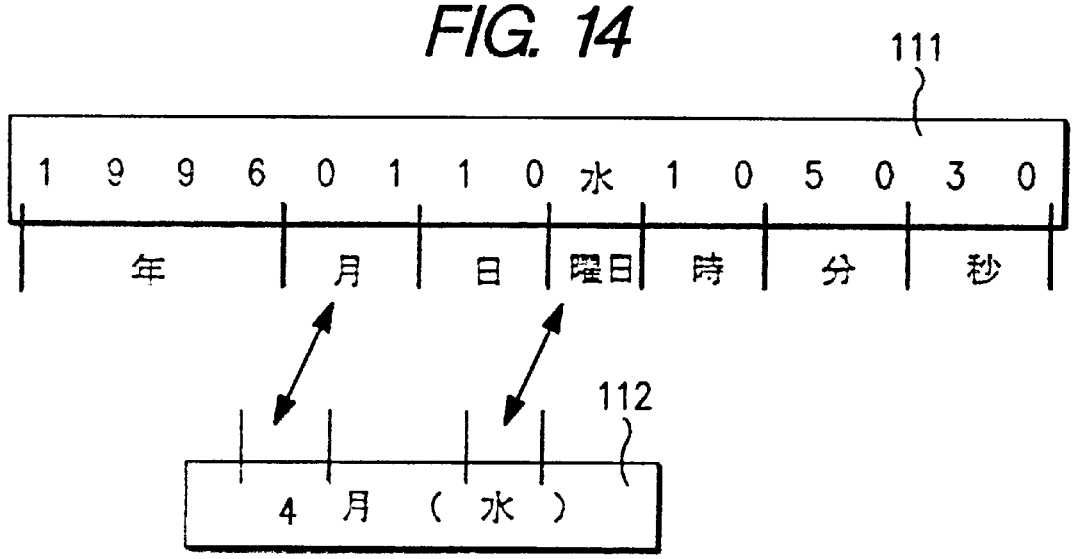
FIG. 14 is a view for explaining comparative positions of a date/time data portion and a handwritten memo title portion.
Figure 15:
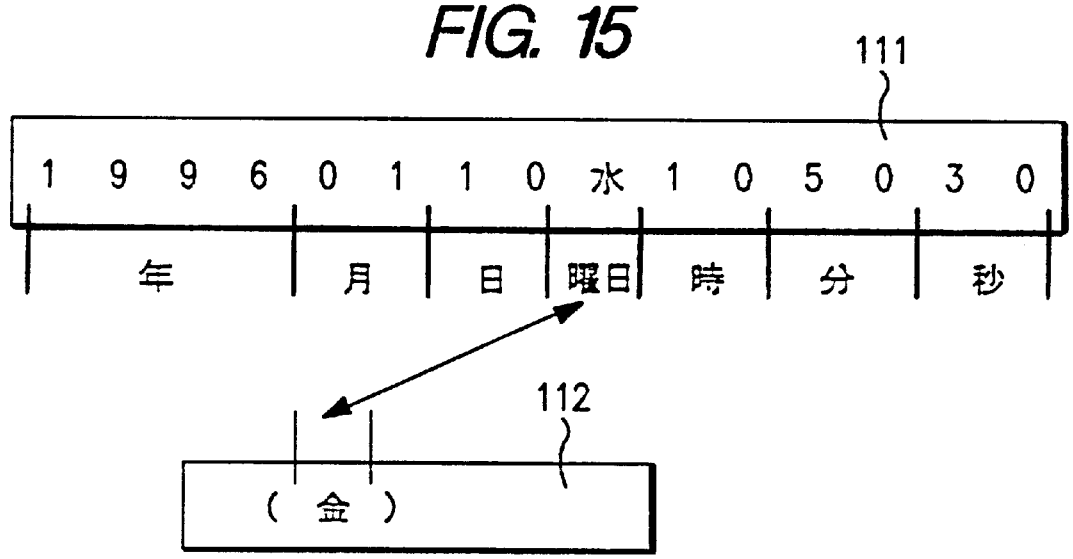
FIG. 15 is a view for explaining comparative positions of a date/time data portion and a handwritten memo title portion.
Figure 16:
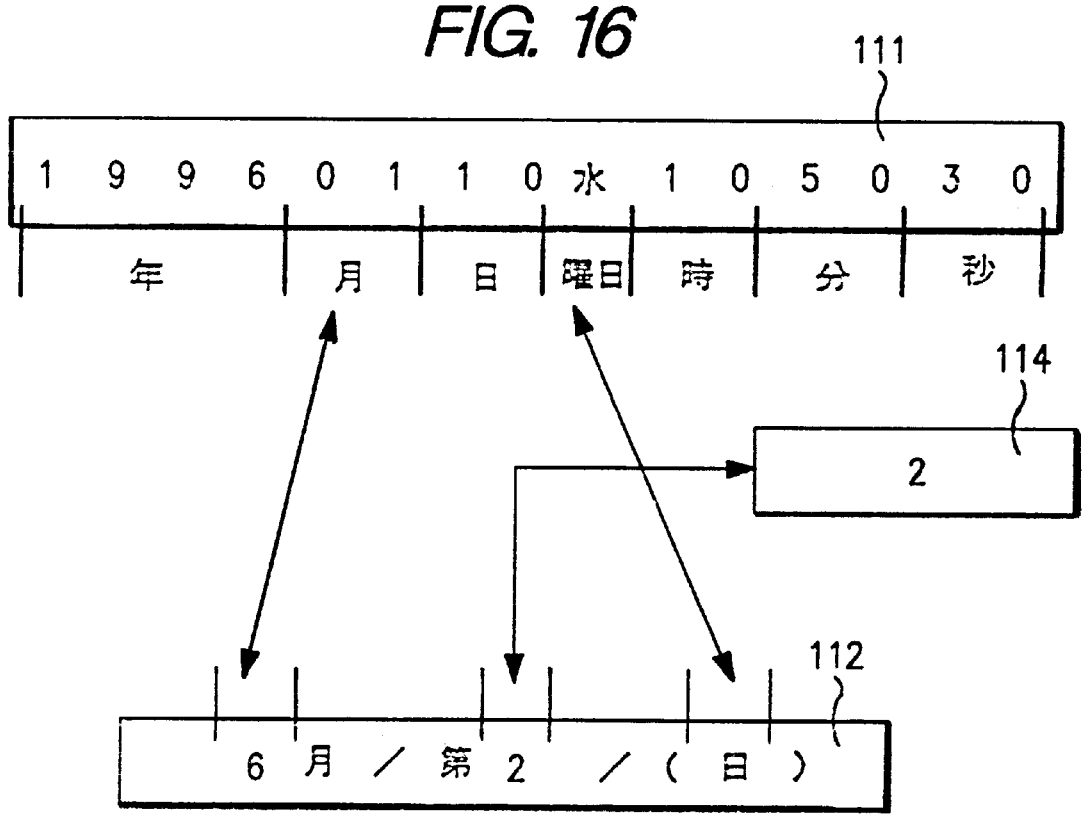
FIG. 16 is a view for explaining comparative positions of a date/time data portion, a handwritten memo title portion and a buffer portion.
Figure 17:
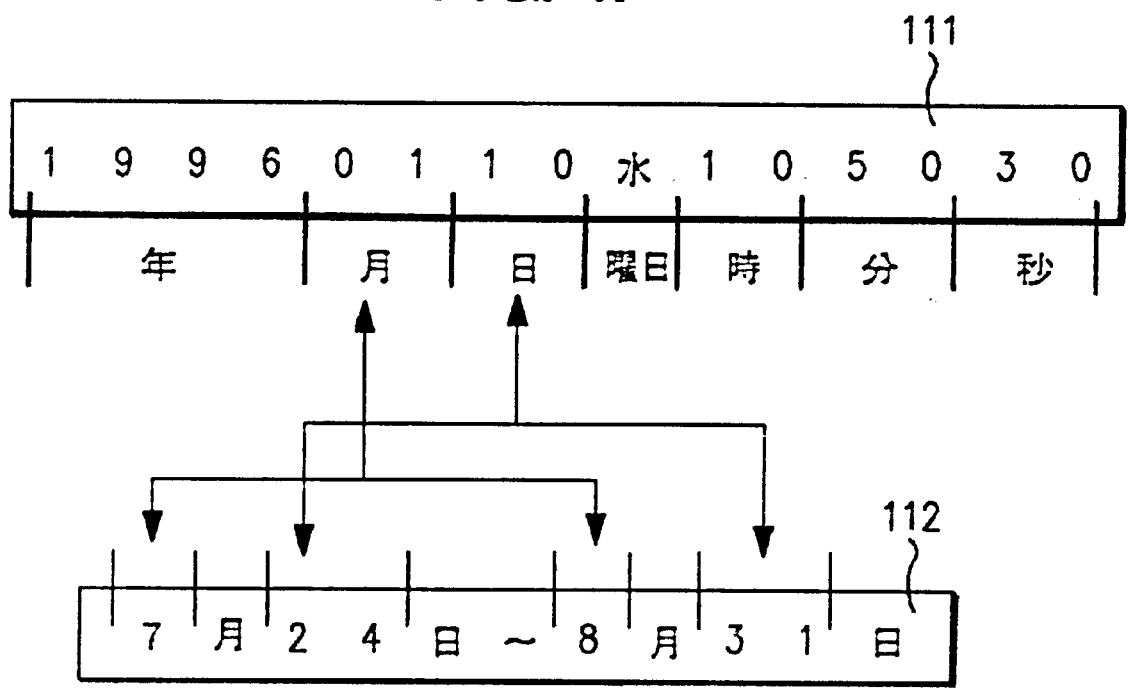
FIG. 17 is a view for explaining comparative positions of a date/time data portion and a handwritten memo title portion.

Data A shown in FIG. 5 is "1月 10日" (1st month 10th day) and as shown in FIG. 11, data A is compared with "01 月 10日" (01 month 10 day) of the date/time data "1996年 01月 10日水 10時 50分 30秒" (1996, 01 month, 10 day, Wednesday, 10 o'clock, 50 minutes, 30 seconds) measured by the clock unit 10. In this case, it is determined that both coincide with each other. Data B is "3月" (3rd month) which is compared with "01月" (01 month) as shown in FIG. 12 and it is determined that both do not coincide with each other. Data C is "25日" (25 th day) which is compared with "10日" (10 day) as shown in FIG. 13 and it is determined that both do not coincide with each other. Data D is "4月 (水)" (4th month (Wednesday)) that is compared with "01月" (01 month) and "水" (Wednesday) as shown in FIG. 14 and it is determined that both do not coincide with each other. Data E is "金" (Friday) which is compared with "水" (Wednesday) as shown in FIG. 15 and it is determined that both do not coincide with each other. Data F is "6月/第2/(日)" (6th month/2nd/(Sunday)) which is compared with "01月" (01 month) and "水" (Wednesday) as shown in FIG. 16 and further, "5日" (2nd) meaning the second order is stored in the buffer portion of FIG. 4. In this case, it is determined that both do not coincide with each other. Data G is "7月 24日~ 8月 31日" (7th month 24th day—8th month 31st day) in which "7月" (7th month) and "8月" (8th month) are compared with "01月" (01 month) and "24日" (24th day) and 31日" (31st day) are compared with "10日" (10th day). In this case, it is determined that both do not coincide with each other.

Whether "01月" (01 month) of the date/time data portion 111 coincides with "1月" (1st month) of the handwritten memo title portion 112 is judged as follows.

First, on the assumption that numerals of the ten and one places of date/time data are a and b, respectively, num. 1 is derived from num. 1=a×10+b×1. In this case, a=0 and b=1, and therefore num. 1=1.

Next, on the assumption that handwritten memo title data is ASCII code A, num. 2 is derived from num. 2=A−30. In this case, A=31 and therefore num. 2=1. Whether num. 1 and num. 2 coincide with each other is determined, and the determination result indicates the consistency or inconsistency between "01月" (01 month) of the date/time data portion 111 and "1月" (1st month) of the handwritten memo title portion 112.

Figure 18:
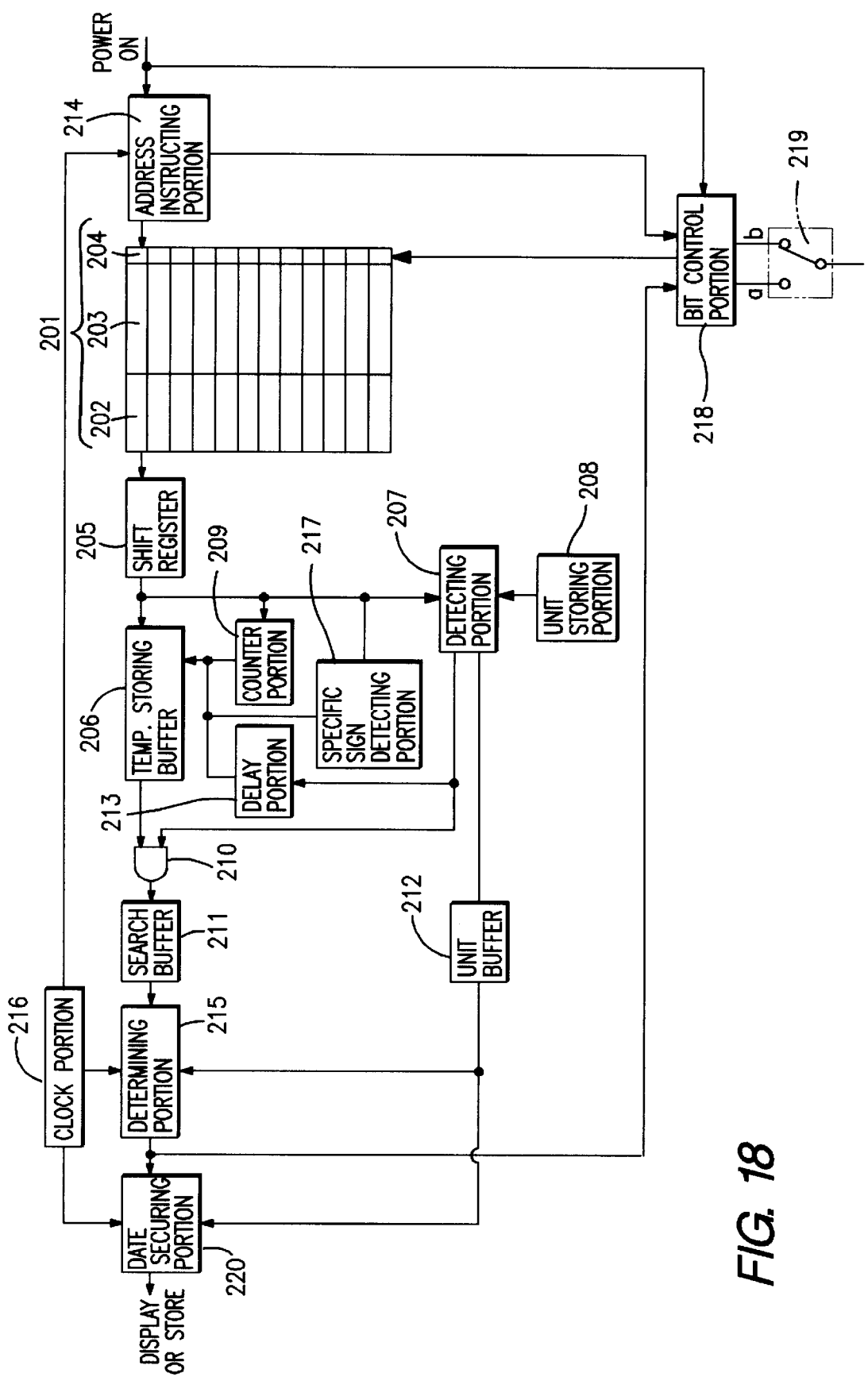
FIG. 18 is a detailed block diagram of the invention.

FIG. 18 is a detailed block diagram of the invention.

A handwritten data portion 201 corresponding to the handwritten data portion 115, is composed of a title data portion 202 corresponding to the handwritten memo title portion 112 and storing a title portion of the handwritten memo data, a handwritten memo data portion 203 corresponding to the handwritten memo data portion 113 and storing handwritten data, and a bit information portion 204 where priority of display is set.

A shift register 205 is a register for storing one series of data of the title data portion 202, which successively memorizes data of the title data portion 202 by receiving an instruction for designating an address from an address instructing portion 214.

A temporary memory buffer 206 is a buffer for successively storing data held at the shift register 205 from a head letter.

A detecting portion 207 detects a date unit inputted in the title data by detecting a coincidence between a unit storing portion 208 for storing a unit of a date and letters outputted form the shift register 205.

A counter portion 209 counts a number of letters outputted from the shift register 205, that is, a number of shifts and when the counter portion 209 counts a specific number of times, that is, a number of times of outputting all of letters of the shift register 205, the content of the temporary memory buffer 206 is cleared.

An AND circuit 210 is a gate to which content of the temporary memory buffer 206 and the unit detection result of the detecting unit 207 are inputted and when the unit is detected by the detecting unit 207, the gate is opened and the content of the temporary memory buffer 206 is transmitted to a next stage of a search buffer 211, mentioned later.

The AND circuit 210 that is a gate is opened in accordance with a result of an output from the detecting unit 207 and the content of the temporary memory buffer 206 is stored as search data in the search buffer 211. A time period for storing the content of the temporary memory buffer 206 to the search buffer 211 since outputting of the detecting portion 207 is produced by a delay portion 213 and thereafter, the content of the temporary memory buffer 206 is cleared.

A unit buffer 212 memorizes units detected by the detecting portion 207.

Date related information sampled from the title data portion 202 is stored to the search buffer 211 and the unit buffer 212 and therefore, a determining portion 215 makes a determination, mentioned later based thereon.

When a plurality of the date related information are included in one series of data of the title data portion 202, the determining portion 215 memorizes the plurality of date related information and determines the coincidence with the date of the clock portion 216 with respect to all the stored content and outputs the coincidence to a bit control portion 218.

A specific sign detecting portion 217 detects "(" signifying start of day of week and clears the content of the temporary memory buffer 206 by detecting the specific sign.

The bit control portion 218 sets a priority display bit flag of the bit information portion 204 corresponding to the title data portion 202 instructed by the address instructing portion 214 based on the output from the determining portion 215. Further, the bit control portion 218 also serves to specify information where a priority bit of the bit information portion 204 is set when power source is turned on.

Next, an explanation will be given based on specific examples.

Now, for example, assume that data of "大阪" (Osaka), "1996年 4月" (1996 year, 4th month), "4月 3日" (4 th month 3rd day) are stored in the title data portion 202 of the handwritten data portion 201. Assume that a map of Osaka is stored in the handwritten memo data portion 203 corresponding to "大阪" (Osaka) of the title data portion 202 and a picture of cherry is stored in the handwritten memo data portion 203 corresponding to "1996年 4月" (1996 year, 4th month).

When a minimum unit (for example, minute) of date is changed at the clock portion 216, an output from the clock portion 216 is given to the address instructing portion 214. The address instructing portion 214 successively makes an addressing operation with respect to an address of the handwritten data portion 201 in response to the output from the clock portion 216 and the content of the title data portion 202 is copied to the shift register 205. The shift register 205 can hold a number of letters the same as a number of letters of the title data portion 202 and it is assumed that both of the title data portion 202 and the shift register 205 can memorize 10 letters.

The initial data of the title data portion 202 is "大阪" (Osaka), and "大阪" (Osaka) is stored in the shift register 205. Letters stored in the shift register 205 are outputted to the temporary memory buffer 206 successively from a head letter by shifting 10 times and temporary memory buffer 206 stores them temporarily. Since the content stored in the shift register 205 is now "大阪" (Osaka), firstly, a Chinese letter "大" (O) is outputted from the shift register 205 and the Chinese letter "大" (O) is stored in the temporary memory buffer 206.

The output from the shift register 205 is simultaneously transmitted also to the counter portion 209 and the detecting portion 207. The counter portion 209 counts signals from the shift register 205 and all the content of the shift register 205 is outputted. The content of the temporary memory buffer 206 is cleared by counting 10 times. In this case, "1" is counted since it is a first letter. The detecting portion 207 detects whether the letter "0" outputted from the shift register 205 is a unit stored in the unit memory portion 208. In this case, it is not a unit and therefore, no operation is conducted.

Next, a Chinese letter "阪" (saka) is outputted from the shift register 205 and Chinese letters "大阪" (Osaka) are stored in the temporary memory buffer 206, the counting at the counter portion 209 is incremented to "2" and the Chinese letter "阪" (saka) is not a unit by detection through the detecting unit 207 and therefore, processing at the detecting portion 207 are not particularly conducted.

This operation is repeated, the counter of the counter portion 209 counts "10" without performing a detection by the detecting unit 207 and the Chinese letters "大阪" (Osaka) stored in the temporary memory buffer 206 are cleared.

Successively, "1996年 4月" (1996 year, 4th month) of a next line of the title data portion 202 is stored in the shift register 205 by the address instructing portion 214 and the data is outputted from the shift register 205 in the order of "9", "9", "6" and stored as "1996" in the temporary memory er 206 by which the counting at the counter portion 209 incremented to "4".

Then, "年" (Year) is successively outputted from the shift register 205, the content of the temporary memory buffer becomes "1996年" (1996th Year), the content is compared the unit of the unit memory portion 208 by the detecting ion 207, the detection is outputted to the AND circuit 210 the delay portion 213 and the detected unit is outputted he unit buffer 212. The AND circuit 210 copies the content ed in the temporary memory buffer 206 to the search buffer by receiving an output result from the detecting portion and thereafter, the content of the temporary memory buffer is cleared by an output from the delay portion 213 which receives an output from the detecting portion 207.

Next, "4" (4th) and "月" (Month) are outputted from the shift register 205, "月" (Month) is detected by the detecting portion 207, "4月" (4th Month) is added to "1996年" (1996th Year) previously stored in the search buffer 211 and "1996年 4月" (1996th Year 4th Month) is stored. When "10" is counted by the counter portion 209, the content is compared with the content of the clock portion 216 by the determining portion based on the stored content of the search buffer 211 and the unit buffer 212. Assume that the counted time of the clock portion 216 is "1996年 4月 1日" (1996 year 4 month 1 day . . . ), outputting is conducted from the determining portion 215 and bits are set in the bit information portion 204 corresponding to an address indicated by the address instructing portion 214 in the bit control portion 218.

The processing is carried out similarly in respect of "5月 3日" (5th month 3rd day) stored in a next line of the title data portion 202, and "5月 3日" (5th month 3rd day) is stored in the search buffer 211 and "月日" (month and Day) is stored in the unit buffer 212, however, the bit control portion 204 does not particularly conduct processing since the coincidence at the determining portion 215 is not detected.

Bits can be set to information to be displayed by executing the above-described processing at every time of a change in the minimum unit of the clock portion 216 and when power source is turned on at a next time, the address instructing portion 214 successively makes an access to information of the bit information portion 204, detects information where bits are set to the bit control portion 218 and displays by outputting the contents of the title data portion 202 and the handwritten memo data portion 203 corresponding to detected information and resets the bits.

Further, a number of detection can be reduced by storing the content of the title data portion 202 in an order of date and detecting a succession of finally detected positions at a previous time.

To specifically conduct the above-described display, the display is not carried out at a next time by replacing bits indicating that the display has been performed with bits set to the bit information portion 204.

An explanation will be given of the above-described processing on the basis of a flowchart of FIG. 19.

At step S111, a series of data is copied to the shift register 205 from stored data of the title data portion 202 of the handwritten data portion 201. At step S112, whether the counter portion 209 counting a number of times of shifts of the shift register 205, counts a number of times for outputting all the data from the shift register 205, is determined and when it is determined that the number reaches a predetermined number of times for outputting all the content of the shift register 205, the operation proceeds to step S120 and when it is determined that the number does not reach the predetermined number of times, the operation proceeds to step S113.

At step S113, the content of the shift register 205 is shifted and at step S114, letters outputted from the shift register 205 are stored in the temporary memory buffer 206. At step S115, whether the letters outputted from the shift register 205 coincide with units (Year, Month, Day and the like) stored in the unit memory portion 208 is detected by the detecting portion 207 and when they coincide with each other, the operation proceeds to step S117 and when they do not coincide with each other, the operation proceeds to step S116.

At step S116, the value of the counter portion 209 is incremented and the operation returns to step S112. At step S117, the AND circuit 210 is opened by a signal from the detecting portion 207, the content stored in the temporary memory buffer 206 is copied to the search buffer 211 and at step S118, the units which have coincided with the letters are stored in the unit buffer 212. At step S119, the content of the temporary memory buffer 206 is cleared and thereafter, the operation returns to step S112.

When it is determined that at step S112, the number of count reaches the predetermined number of times for outputting the content of the shift register 205, the coincidence of the content with the date of the clock portion 216 is successively determined at step S120 based on the search buffer 211 and the unit buffer 212, and when they coincide with each other, at step S121, bits of the corresponding data in the bit information portion 204 is set by the bit control portion 218 and the operation proceeds to step S122. Further, when they do not coincide with each other, the operation proceeds to step S122. In this case, when the data has been displayed, bits are not set.

At step S122, similar to step S119, the content of the temporary memory buffer 206 is cleared. At step S123, whether there is next data in the handwritten data portion 201 is determined, when there is no data, the processing is finished and when there still is data, the operation returns to step S111 to repeat determination processing with respect to next data.

Figure 20:
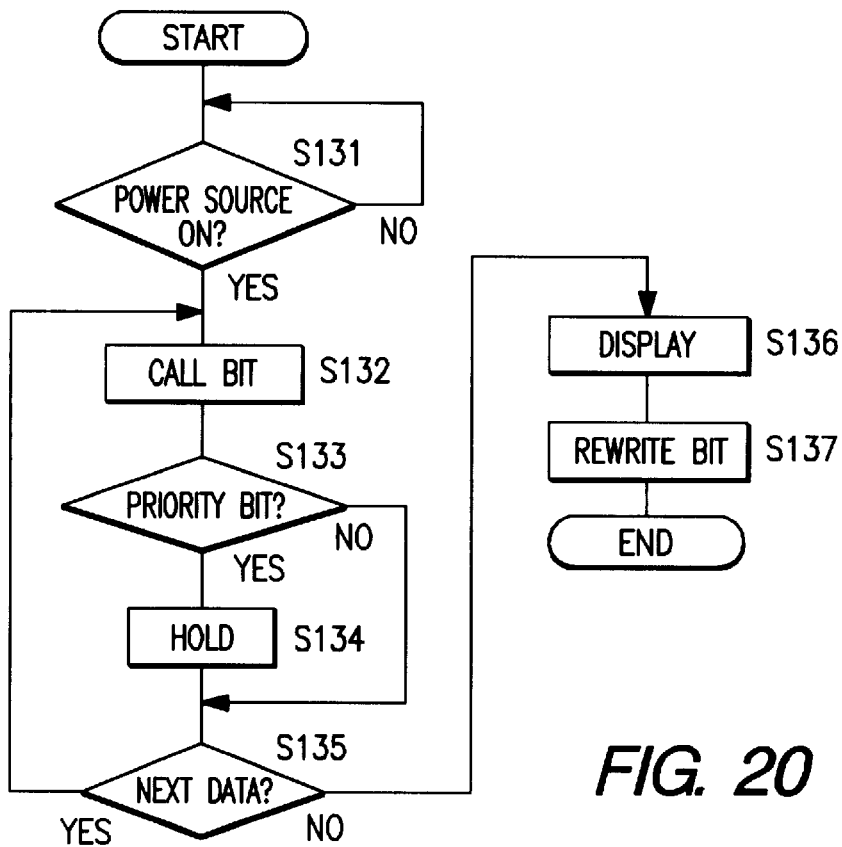
FIG. 20 is a flowchart concerning processing in turning on a power source.

FIG. 20 is a flowchart concerning processing in turning on a power source.

At step S131, instruction of turning on the power source is awaited, when the instruction of turning on the power source is received, bits of the bit information portion 204 are called at step S132. At step S133, whether the bits called at step S132 are priority bits signifying display is determined, when they are priority bits, the operation proceeds to step S134 and when they are not priority bits, the operation proceeds to step S135.

At step S134, the content of a corresponding line of the title data portion 202 where the priority bits are set and the handwritten memo data portion 203 are temporarily held and the operation proceeds to step S135. At step S135, whether determination is conducted with respect to all the data is checked, when the check with respect to all the data has been finished, the held content is displayed at step S136, the priority bits are rewritten as displayed data at step S137 and the display is carried out at a next time. When there is next data at step S135, the operation returns to step S132.

The priority bits can be set at a next time of coincidence by resetting the priority bits without rewriting the priority bits as displayed data at step S137.

Figure 21:
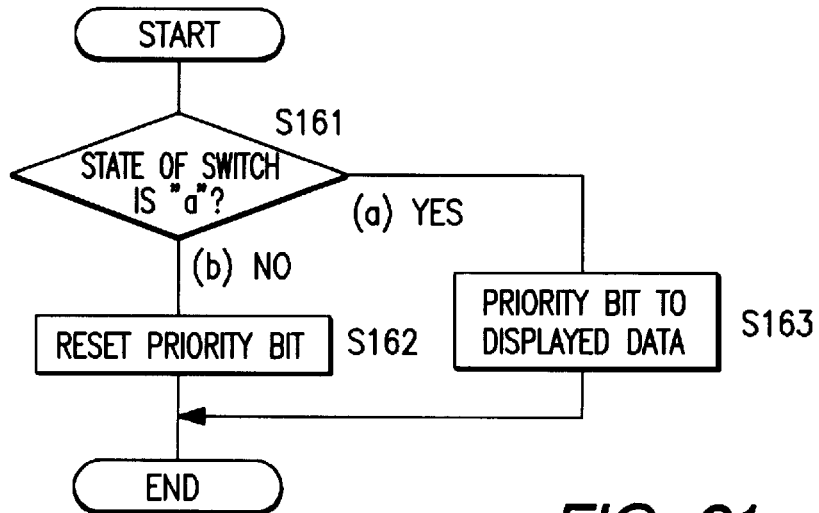
FIG. 21 is a flowchart of control by a switch 219.

Processing at step S137 is selected by a switch 219 of FIG. 18. FIG. 21 shows a flowchart of control by the switch 219. The switch 219 is a switch which can be arbitrarily set by a user and the bit control is switched by which of "a" and "b" the switch is set, when bits are written. When the switch is set to "a" side at step S161, the operation proceeds to step S163 where the bit control carries out display only once and when the switch is set to "b" side, the operation proceeds to step S162 where a bit control can display again.

Although an explanation has been given of processing specifying date information by using the units following numerical values in the above example, an explanation will be given of the case of day of week interposed by specific signals as follows.

In FIG. 18, when a letter outputted from the shift register 205 is "(", the letter is detected by the specific sign detecting portion 217 and the content of the temporary memory buffer 206 is cleared. Letters successively outputted from the shift register 205 are sent to the temporary memory buffer 206 and when ")" stored in the unit memory portion 208 is detected by the detecting portion 207, the content of the temporary memory buffer 206 is sent to the search buffer 211 via the AND circuit 210.

Figure 22:
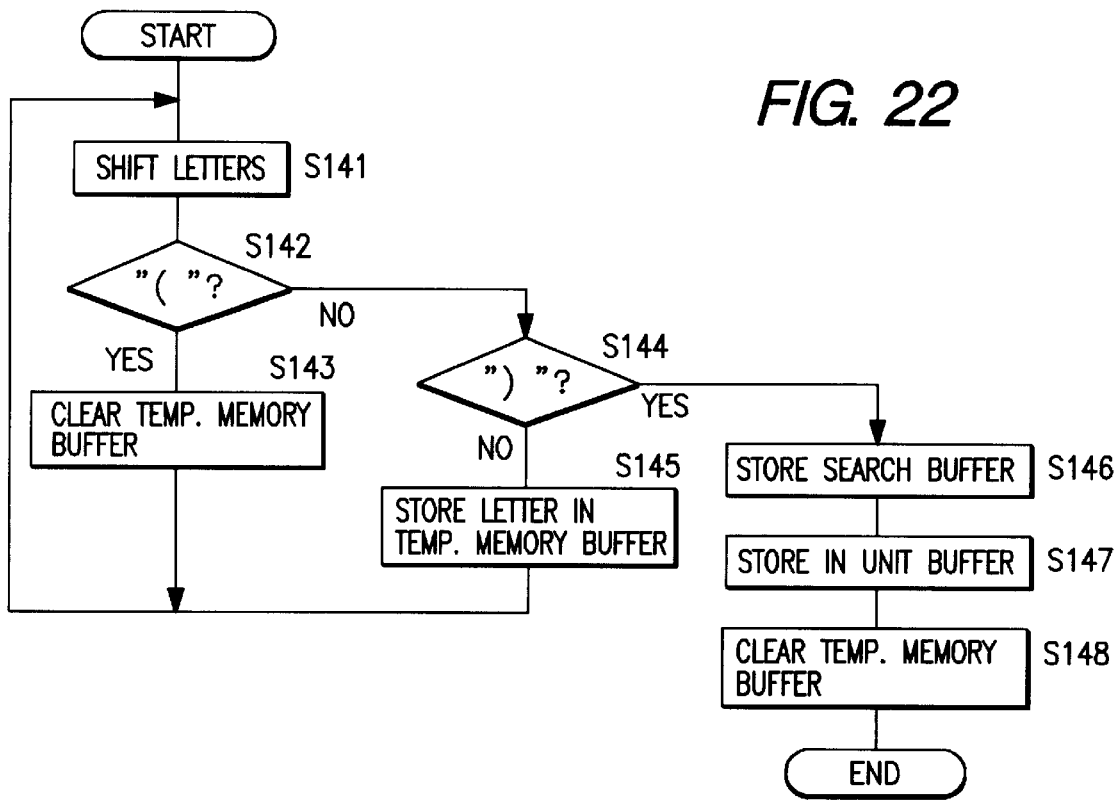
FIG. 22 is a flowchart concerning processing of comparing a date/time data portion and a handwritten memo title portion.

An explanation will be given of the above-described processing in reference to a flowchart of FIG. 22.

Figure 19:
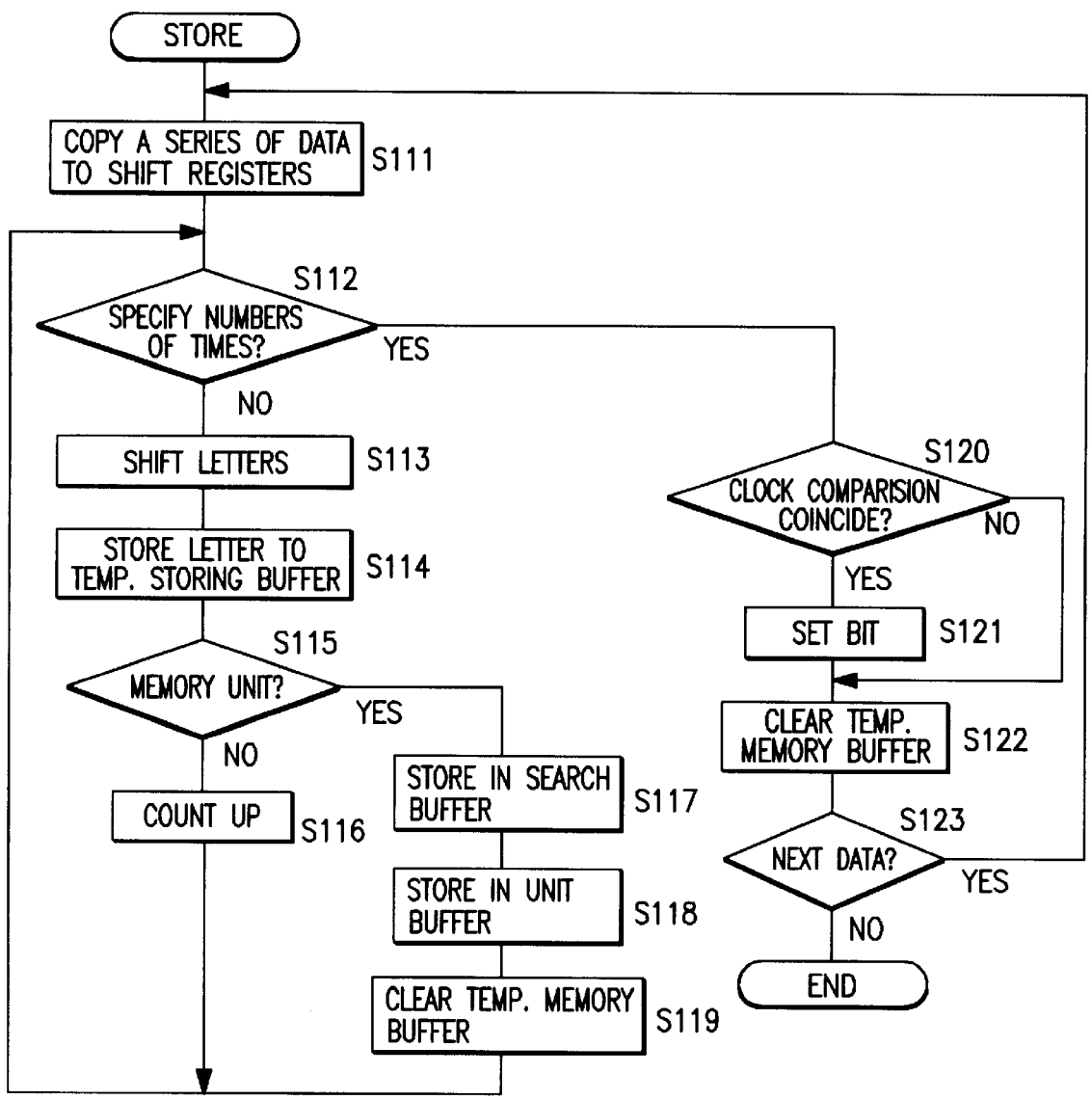
FIG. 19 is a flowchart concerning processing of comparing a date/time data portion and a handwritten memo title portion.

At step S141, processing similar to that at step S113 and step S114 of FIG. 19 are carried out, at step S142, whether a letter is "(" is detected and when the letter is "(", the content of the temporary memory buffer 206 is cleared at step S143. When "(" is not detected at step S142 ")" is detected at step S144. When ")" is not detected, the content is stored in the temporary memory buffer 206 at step S145. When the processing at step S143 and step S145 has been finished, the operation returns to step S141. When ")" is detected at step S144, processing similar to that at step S117, step S118 and step S119 of FIG. 19 is carried out at step S146, at step S147 and step S148, respectively.

Next, an explanation will be given of display of date.

In a date securing portion 220 shown in FIG. 18, date is read from the clock portion 216 and a unit portion corresponding to a unit stored in the unit buffer 212 is reversed and date of the day is displayed in accordance with the determination from the determining portion 215. In this case, power source is not necessarily turned on when the dates coincide with each other at the determining portion 215 and therefore, when time of determination thereof is stored in the handwritten data portion 201 and displayed along with a handwritten figure in displaying, pertinent date can be confirmed even when it is confirmed later.

Figure 23:
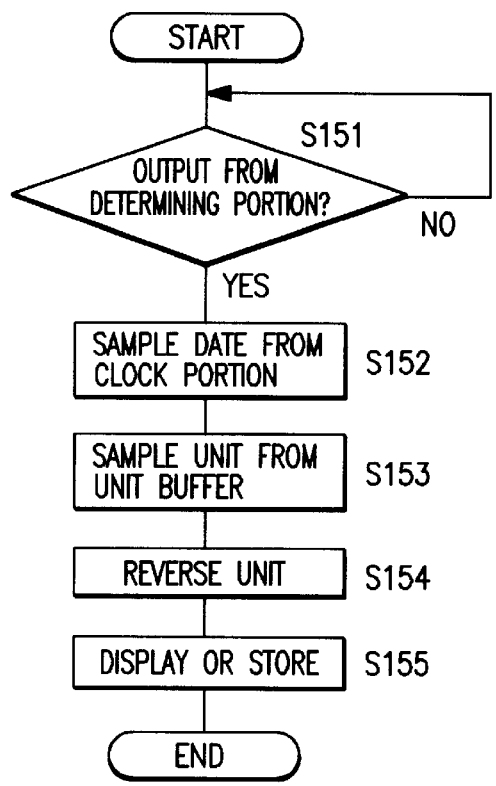
FIG. 23 is a flowchart concerning processing of date display.

An explanation will be given of the above-described processing in reference to a flowchart of FIG. 23.

At step S151, an output from the determining portion 215 is awaited, and when there is an output, current date information is inputted from the clock portion 216 at step S152. Thereby, information which is not stored to the title data portion 202 can be inputted. At step S153, a unit which is stored in the unit buffer 212 is sampled and date corresponding to the inputted unit is reversed at step S154 and the content is displayed or stored at step S155.

Figure 24A:
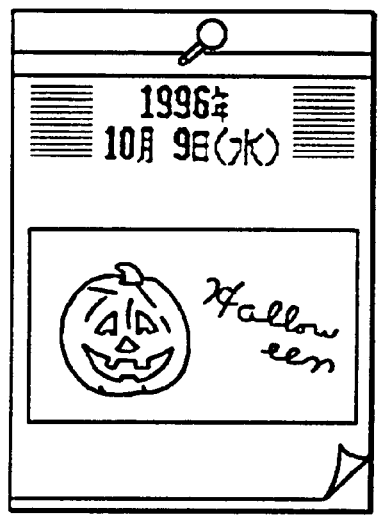
Figure 24B:
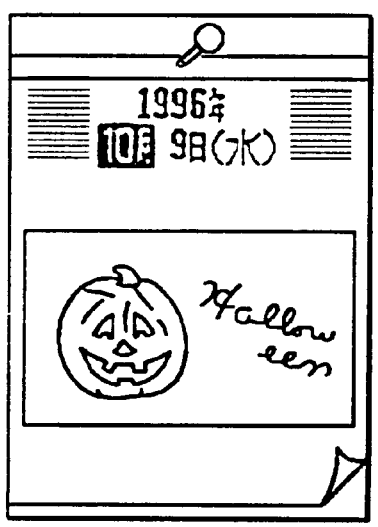

For example, when data of 1996th Year 10th Month 10th Day Wednesday is sampled in October, "10th Month" shown in FIG. 24A is displayed by being reversed in respect of white and black colors as shown in FIG. 24B.

The invention may be embodied in other specific forms without departing from the sprit or essential characteristics thereof. The present embodiments are therefore to be considered in all respects as illustrative and not restrictive, the scope of the invention being indicated by the appended claims rather than by the foregoing description and all changes which come within the meaning and the range of equivalency of the claims are therefore intended to be embraced therein.

What is claimed is:

1. An electronic apparatus comprising:

handwritten information inputting means for inputting handwritten information;

title inputting means for inputting a title of the handwritten information inputted by the handwritten information inputting means;

memory means for correspondingly storing the handwritten information inputted by the handwritten information inputting means and the title inputted by the title inputting means;

time measuring means for measuring a current date;

determining means for determining whether the title stored in the memory means includes date information;

comparing means for comparing the date information of the title with the current date when the title is judged from a result of determination by the determining means as including the date information; and displaying means for displaying the handwritten information stored in correspondence with the title when the date information in the title coincides with the current date from a result of comparison by the comparing means.

2. The electronic apparatus of claim 1, wherein the displaying means displays the current date along with the handwritten information.

3. An electronic apparatus comprising:

handwritten information inputting means for inputting handwritten information;

title inputting means for inputting a title of the handwritten information inputted by the handwritten information inputting means;

memory means for correspondingly storing the handwritten information inputted by the handwritten information inputting means and the title inputted by the title inputting means;

time measuring means for measuring a current date;

determining means for determining whether the title stored in the memory means includes date information;

comparing means for comparing the date information of the title with the current date when the title is judged from a result of determination by the determining means as including the date information;

storage means for, when the date information in the title is judged from a result of comparison by the comparing means as being coincident with the current date, storing information of the coincidence in the memory means in correspondence of the information to the title and the handwritten information; and displaying means for displaying the handwritten information stored in correspondence of the information of the coincidence by the storage means in response to turning on a power source.

4. The electronic apparatus of claim 3, further comprising erasing means for erasing from the storage means the information of the coincidence in correspondence with the handwritten information displayed by the displaying means in response to turning on the power source.

5. The electronic apparatus of claim 3, further comprising setting means for setting whether the displaying means displays the handwritten information stored in correspondence with the information of the coincidence at every time of turning on the power source or displays only once in response to turning on the power source.

* * * * *